United States Patent
Priyadarshana (10) Patent No.: US 10,809,107 B2
(45) Date of Patent: Oct. 20, 2020

(54) MULTI-FLUID CALIBRATION

(71) Applicant: Daniel Measurement and Control, Inc., Houston, TX (US)

(72) Inventor: Paththage Jayampathi Anuradha Priyadarshana, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 428 days.

(21) Appl. No.: 15/847,445

(22) Filed: Dec. 19, 2017

(65) Prior Publication Data
US 2019/0186967 A1    Jun. 20, 2019

(51) Int. Cl.
*G01F 1/66*    (2006.01)
*G01F 25/00*    (2006.01)
*G01F 15/00*    (2006.01)

(52) U.S. Cl.
CPC .............. *G01F 1/667* (2013.01); *G01F 1/662* (2013.01); *G01F 25/0007* (2013.01); *G01F 15/00* (2013.01); *G01F 25/003* (2013.01); *G01F 25/0015* (2013.01)

(58) Field of Classification Search
CPC .......... G01F 15/00; G01F 1/662; G01F 1/667; G01F 25/0007; G01F 25/0015; G01F 25/003
USPC .............................. 702/45, 48, 50; 73/861.28
See application file for complete search history.

(56) References Cited

U.S. PATENT DOCUMENTS

| | | | |
|---|---|---|---|
| 5,705,753 A * | 1/1998 | Hastings | G01F 1/662 374/E11.01 |
| 5,824,879 A | 10/1998 | Brown | |
| 5,987,997 A | 11/1999 | Roskam et al. | |
| 9,068,870 B2 | 6/2015 | Priyadarshana et al. | |
| 10,012,521 B2 * | 7/2018 | Priyadarshana | G01F 1/66 |
| 2006/0272417 A1 | 12/2006 | Zanker et al. | |
| 2014/0109690 A1 | 4/2014 | Ramsay et al. | |
| 2014/0238148 A1 * | 8/2014 | Priyadarshana | G01F 1/662 73/861.28 |
| 2015/0260558 A1 * | 9/2015 | Priyadarshana | G01F 1/66 702/48 |

FOREIGN PATENT DOCUMENTS

| | | |
|---|---|---|
| CN | 1603771 A | 4/2005 |
| CN | 102762960 A | 10/2012 |
| CN | 103154677 A | 6/2013 |

OTHER PUBLICATIONS

Chinese Office Action; Application No. 201810631544.6; dated Feb. 25, 2020; 15 pages.

(Continued)

*Primary Examiner* — John H Le
(74) *Attorney, Agent, or Firm* — Conley Rose, P.C.

(57) ABSTRACT

A flow meter system includes a flow meter configured to enable a first flow of a first fluid; and transmitter electronics coupled to the flow meter and configured to calculate a PF of the first fluid, calculate an MF corresponding to the first PF based on a correlation between PFs and MFs, and calculate a first volume of the first fluid using the first MF. A method includes establishing a correlation between MFs and PFs for a first fluid and a second fluid; storing the correlation in transmitter electronics of a flow meter system; testing the flow meter system using the correlation; and performing measurements using the correlation.

24 Claims, 7 Drawing Sheets

(56) References Cited

OTHER PUBLICATIONS

Chinese Office Action; Application No. 201820945702.0; dated Nov. 5, 2018; 5 pages.
PCT International Search Report & Written Opinion of the International Searching Authority; Application No. PCT/US2018/066560; dated Apr. 23, 2019; 13 pages.

* cited by examiner

MULTI-FLUID CALIBRATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When pipelines transport fluids such as liquid hydrocarbons, it is desirable to accurately determine how much fluid is flowing through those pipelines. It is particularly desirable when one entity passes a fluid to another entity because such custody transfer transactions are typically for sales of specified amounts of fluids. To accurately measure volumetric amounts of fluids, the entities may use flow meters such as liquid ultrasonic flow meters.

Ultrasonic flow meters transfer acoustic signals across fluids for flow measurements. Based on the acoustic signals, the ultrasonic flow meters determine average velocities of the fluids. An operator or other entity may calculate cross-sectional areas of the ultrasonic flow meters using known dimensions. Based on the average velocities and the cross-sectional areas, the ultrasonic flow meters determine volumes of the fluids flowing through the pipelines.

SUMMARY

In one embodiment, the disclosure includes a flow meter system comprising a flow meter configured to enable a first flow of a first fluid; and transmitter electronics coupled to the flow meter and configured to calculate a PF of the first fluid, calculate an MF corresponding to the first PF based on a correlation between PFs and MFs, and calculate a first volume of the first fluid using the first MF.

In another embodiment, the disclosure includes a method comprising enabling a first flow of a first fluid; calculating a first PF of the first fluid; calculating an MF corresponding to the first PF based on a correlation between PFs and MFs; and calculating a first volume of the first fluid using the first MF.

In yet another embodiment, the disclosure includes a method comprising establishing a correlation between MFs and PFs for a first fluid and a second fluid; storing the correlation in transmitter electronics of a flow meter system; testing the flow meter system using the correlation; and performing measurements using the correlation.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
CPU: central processing unit
cSt: centistroke(s)
DSP: digital signal processor
EO: electrical-to-optical
FPGA: field-programmable gate array
kHz: kilohertz
m: meter(s)
MF: meter factor
OE: optical-to-electrical
PF: profile factor
RAM: random-access memory
RF: radio frequency
ROM: read-only memory
RX: receiver
s: second(s)
SRAM: static RAM
TCAM: ternary content-addressable memory
TX: transmitter
%: percent.

Disclosed herein are embodiments for multi-fluid measurement correction. The embodiments provide a correlation between PFs and MFs so that a flow meter system may calculate a different MF for each PF. By calculating and applying different MFs, the flow meter system makes more accurate measurements such as volume measurements within an error of about 0.15% or less. In addition, the flow meter system makes measurements for multiple fluids. This is because fluids of different viscosities or Reynolds numbers may not have overlapping PF ranges. Thus, PF ranges of multiple fluids may be combined into a single correlation between PFs and MFs. Other approaches based on velocity or flow rate may not make measurements for multiple fluids using a single correction curve because different hydrocarbon fluids have different curves that cannot be combined.

Figure 1:
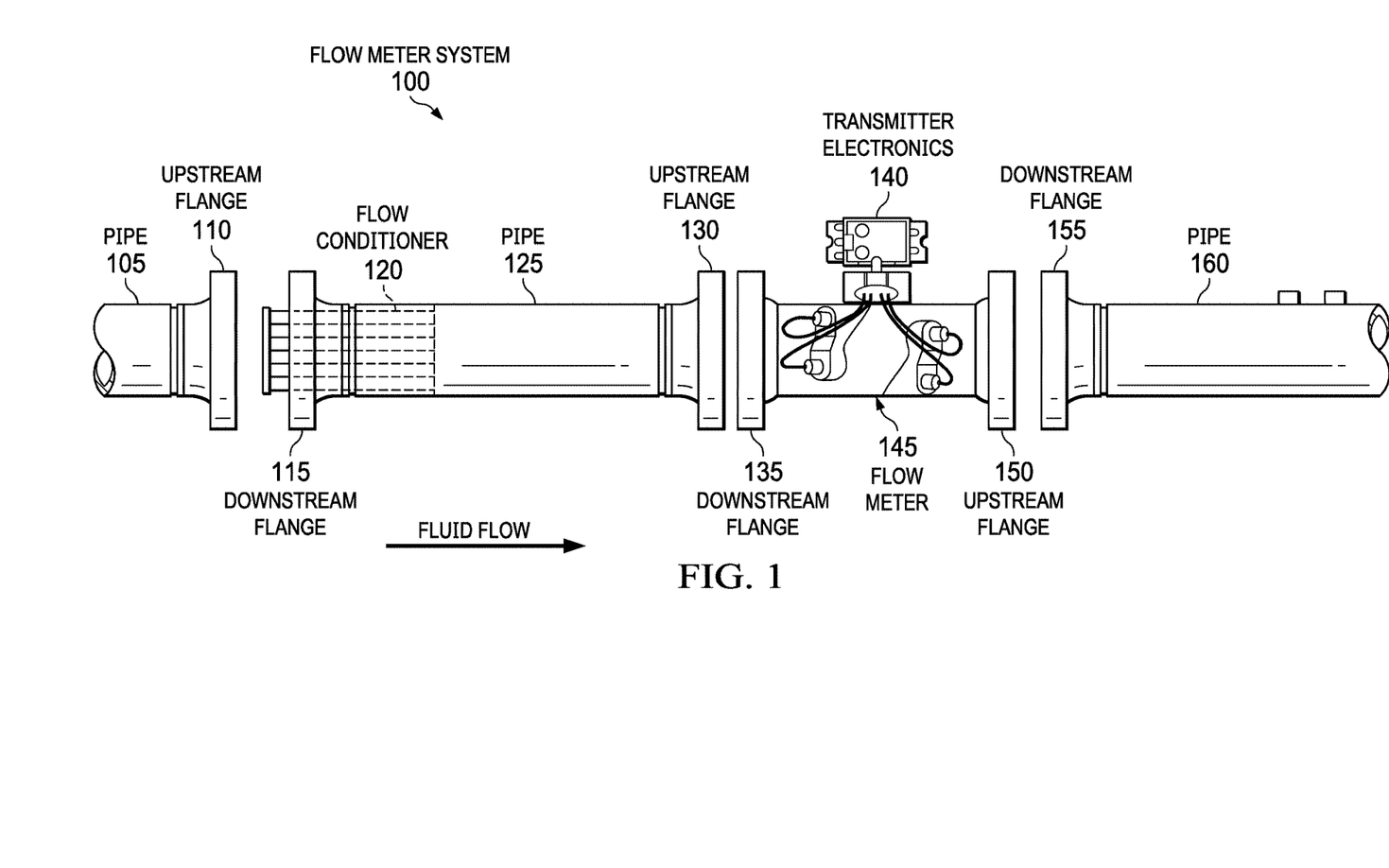
FIG. 1 is a schematic diagram of a flow meter system.

FIG. 1 is a schematic diagram of a flow meter system 100. The flow meter system 100 comprises pipes 105, 125, 160; upstream flanges 110, 130, 150; downstream flanges 115, 135, 155; a flow conditioner 120; transmitter electronics 140; and a flow meter 145. A similar system is described in U.S. Pat. No. 9,068,870 titled "Ultrasonic Flow Metering With Laminar to Turbulent Transition Flow Control" and filed by Daniel Measurement and Control, Inc. ("'870 Patent"), which is incorporated by reference. A downstream direction is a direction from left to right in which fluids flow through the flow meter system 100, and an upstream direction is a direction from right to left and opposite the downstream direction. The terms "downstream" and "upstream" are relative terms so that the downstream flange 115 is downstream from the upstream flange 110, but upstream from the upstream flange 130.

The pipes 105, 125, 160 comprise materials such as high-carbon steel or stainless steel and allow fluids to freely flow. The fluids may be hydrocarbon liquids such as crude oil or refined liquids. The pipe 105 may have a length of at least two times its diameter, the pipe 125 may have a length of eight times its diameter, and the pipe 160 may have a length at least five times its diameter. The upstream flanges 110, 130, 150 and the downstream flanges 115, 135, 155 comprise materials such as high-carbon steel or stainless steel. The upstream flange 110 and the downstream flange 115 facilitate coupling of the pipe 105 to the pipe 125, the upstream flange 130 and the downstream flange 135 facilitate coupling of the pipe 125 to the flow meter 145, and the upstream flange 150 and the downstream flange 155 facilitate coupling of the flow meter 145 to the pipe 160.

The flow conditioner 120 conditions fluids flowing through it by eliminating swirls, reducing large-scale turbulence fluctuations, and improving mean velocity profiles of those fluids. The flow conditioner 120 does so in order to provide more accurate measurements at the flow meter 145. The flow conditioner 120 may be a tube bundle that directs the fluids through a series of tubes or may be a perforated plate that directs the fluids through small apertures.

Compared to the ultrasonic flow metering system in the '870 Patent, the flow meter system 100 does not comprise an expander, a reducer, or a pipe section connecting an expander or a reducer. Those components condition average velocity profiles of fluids and improve repeatability to enable measurements at Reynolds numbers below 5,000. However, such flow velocity reduction may not be necessary in the flow meter system 100 because the flow meter system 100 is designed to perform measurements at Reynolds numbers between 7,000 and 200,000.

Figure 2:
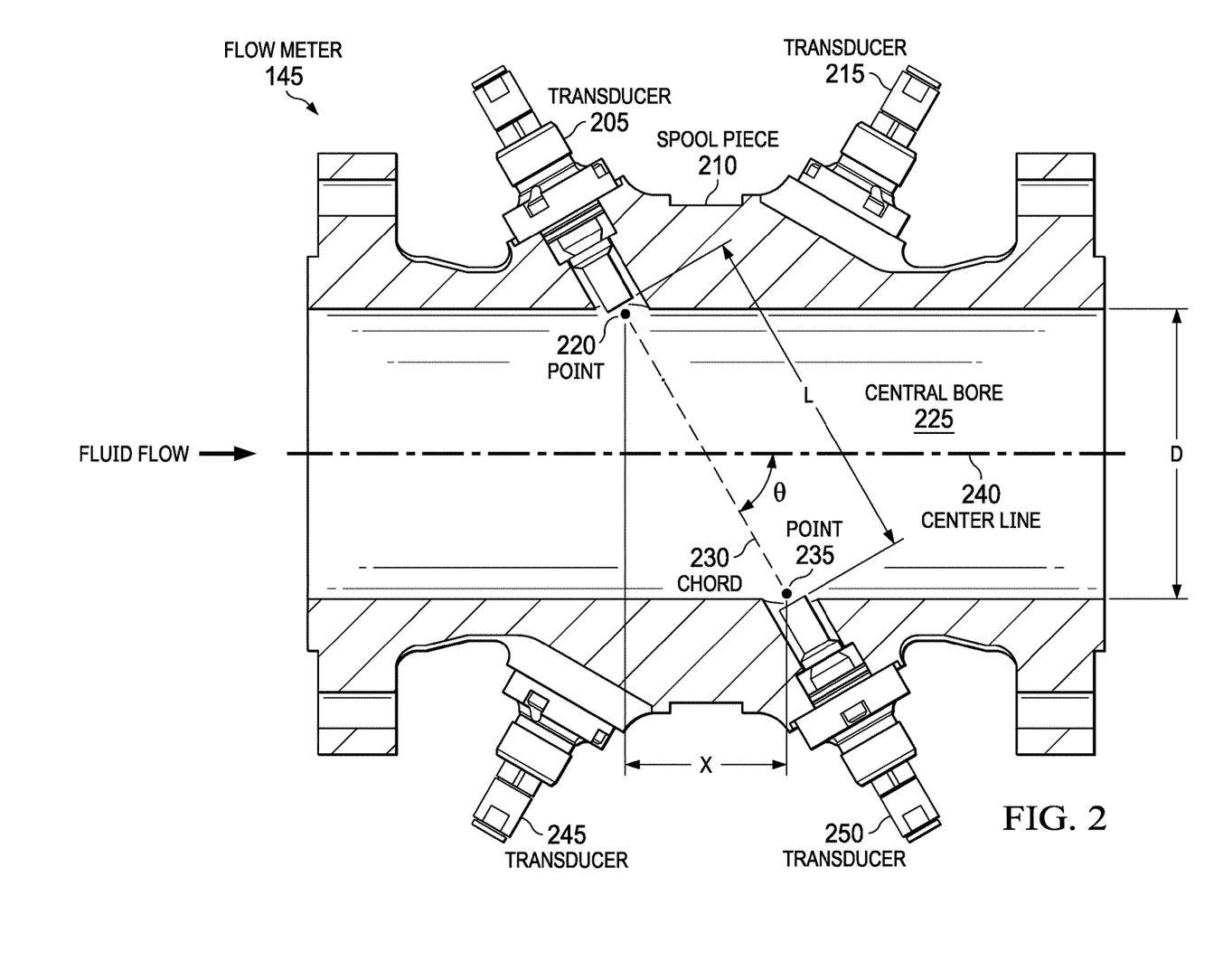
FIG. 2 is a cross-sectional overhead view of the flow meter in FIG. 1.

FIG. 2 is a cross-sectional overhead view of the flow meter 145 in FIG. 1. FIG. 2 shows that the flow meter 145 comprises a spool piece 210 and transducers 205, 215, 245, 250. The spool piece 210 defines a central bore 225 with a diameter D. The central bore 225 allows fluids to freely flow through it. The transducers 205, 215, 245, 250 are acoustic transceivers that generate and transmit acoustic signals on one hand and receive acoustic signals on the other hand. The acoustic signals may be ultrasonic signals above about 20 kHz.

For the transducers 205, 215, 245, 250 to generate and transmit acoustic signals, the transmitter electronics 140 shown in FIG. 1 transmit analog electrical signals to the transducers 205, 215, 245, 250. Piezoelectric elements in the transducers 205, 215, 245, 250 receive the analog electrical signals and vibrate in response, and the vibrations generate ultrasonic signals. The transducers 205, 215 transmit the ultrasonic signals through fluids flowing through the central bore 225 and to opposing transducers 245, 250.

For the transducers 205, 215, 245, 250 to receive acoustic signals, piezoelectric elements in the transducers 205, 215, 245, 250 receive the acoustic signals and vibrate in response, and the vibrations generate analog electrical signals. The transducers 205, 215, 245, 250 transmit the analog electrical signals to the transmitter electronics 140. The transmitter electronics 140 detect the analog electrical signals, digitize the analog electrical signals to create digital electrical signals, and analyze the digital electrical signals.

A chord 230 exists between the transducer 205 and the transducer 250 at an angle θ with respect to a centerline 240 of the flow meter 145. The chord 230 is a path for ultrasonic signals to travel from a point 220 in the transducer 205 to a point 235 in the transducer 250, or for ultrasonic signals to travel from the point 235 in the transducer 250 to the point 220 in the transducer 205. A chordal flow velocity v of an acoustic signal traveling across the chord 230 is given by:

$$v = \frac{L^2}{2X} \cdot \frac{T_{up} - T_{down}}{T_{up} T_{down}}. \tag{1}$$

L is a length defining a linear distance of the chord 230 between the point 220 and the point 235, X is a length defining an axial distance between the point 220 and the point 235, $T_{up}$ is a time it takes for an acoustic signal to travel from the point 235 to the point 220 or a time of flight in an upstream direction, and $T_{down}$ is a time it takes for an acoustic signal to travel from the point 220 to the point 235 or a time of flight in a downstream direction. v is in units of m/s, L is in units of m, X is in units of m, $T_{up}$ is in units of s, and $T_{down}$ is in units of s. $T_{down}$ is typically smaller than $T_{up}$ because $T_{down}$ is the time of flight for ultrasonic signals traveling in approximately a same direction as fluid direction while $T_{up}$ is the time of flight for ultrasonic signals traveling in approximately an opposite direction as the fluid direction. Though the chord 230 is described, another chord exists between the transducer 215 and the transducer 245 at the angle θ with respect to the centerline 240. Similarly, a typical four-path ultrasonic flow meter has four chords.

Figure 3:
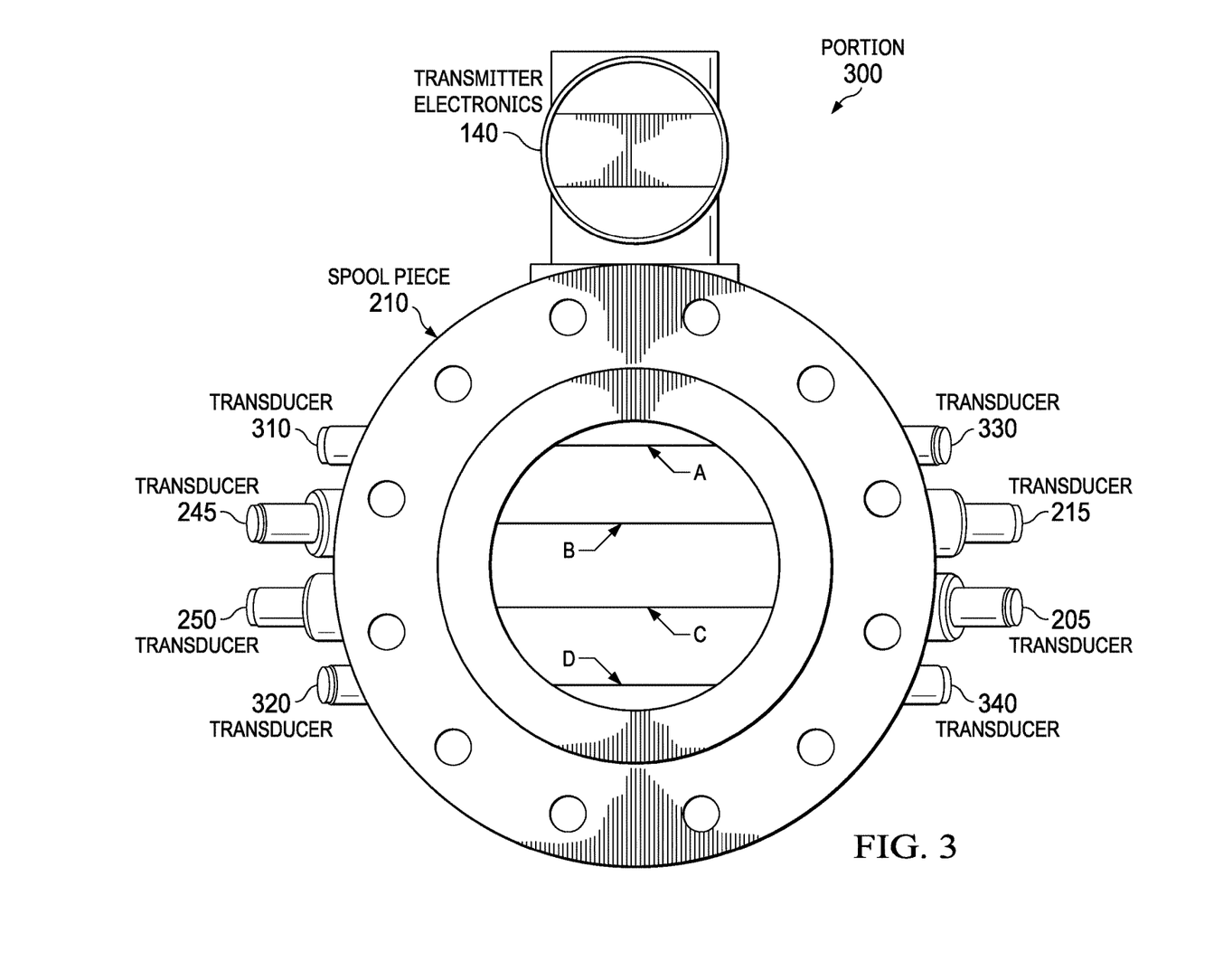
FIG. 3 is a cross-sectional side elevation view of a portion of the flow meter in FIG. 1.

FIG. 3 is a cross-sectional side elevation view of a portion 300 of the flow meter 145 in FIG. 1. The portion 300 comprises the transmitter electronics 140 and the spool piece 210. Like the cross-sectional overhead view in FIG. 2, the cross-sectional side elevation view in FIG. 3 shows that the flow meter 145 comprises the transducers 245, 250, 215, 205. However, unlike the cross-sectional overhead view in FIG. 2, the cross-sectional side elevation view in FIG. 3 also shows that the flow meter 145 comprises transducers 310, 320, 330, 340 and thus four chords.

Chord A exists between the transducer 310 and the transducer 330, chord B exists between the transducer 245 and the transducer 215, chord C exists between the transducer 250 and the transducer 205, and chord D exists between the transducer 320 and the transducer 340. Chord C may be the same as the chord 230 in FIG. 2. Using equation (1), the transmitter electronics 140 calculate $v_A$ for chord A, $v_B$ for chord B, $v_C$ for chord C, and $v_D$ for chord D. The transmitter electronics 140 also calculate PFs as follows:

$$PF = \frac{v_b + v_c}{v_a + v_d}. \quad (2)$$

PF is a dimensionless parameter. As can be seen, PF is a ratio of inner chordal flow velocities to outer chordal flow velocities, where chord B and chord C are inner chords and chord A and chord D are outer chords, and thus $v_B$ and $v_C$ are inner chordal flow velocities and $v_A$ and $v_D$ are outer chordal flow velocities.

Figure 4:
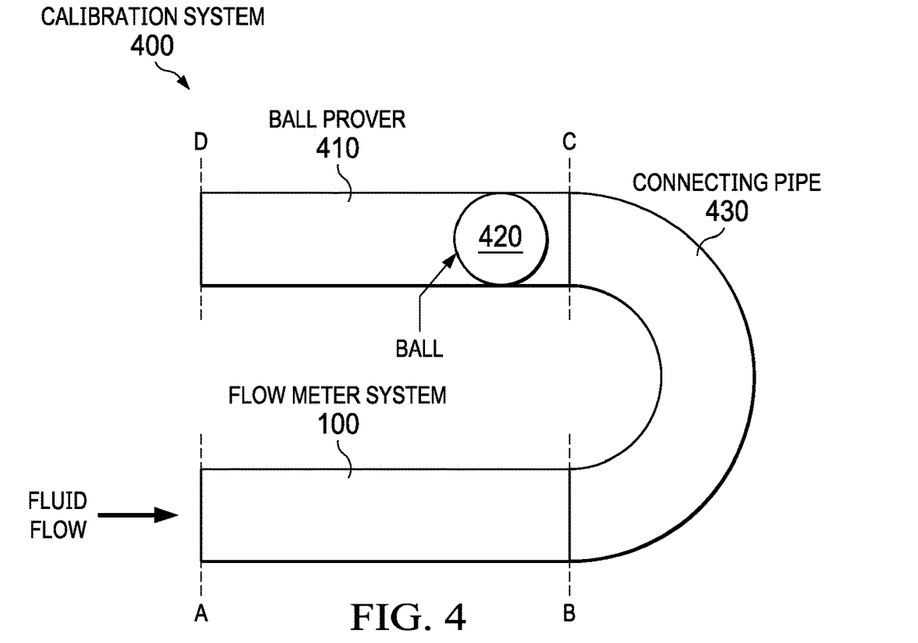
FIG. 4 is a schematic diagram of a calibration system.

FIG. 4 is a schematic diagram of a calibration system 400. The calibration system 400 performs direct proving and may be referred to as a ball prover flow meter calibration system. The calibration system 400 comprises the flow meter system 100 in FIG. 1, a connecting pipe 430, and a ball prover 410. The ball prover 410 is a piece of standard equipment that provides precision measurements when calibrated. The ball prover 410 is either straight or curved and comprises a ball 420. The connecting pipe 430 connects the flow meter system 100 to the ball prover 410 so that the flow meter system 100 and the ball prover 410 are in series with each other. Thus, fluids enter the flow meter system 100 at point A, exit the flow meter system 100 at point B, move from point B to point C within the connecting pipe 430, enter the ball prover 410 at point C, push the ball 420 from point C to point D within the ball prover 410, and exit the ball prover 410 at point D. This system is called direct proving.

Figure 5:
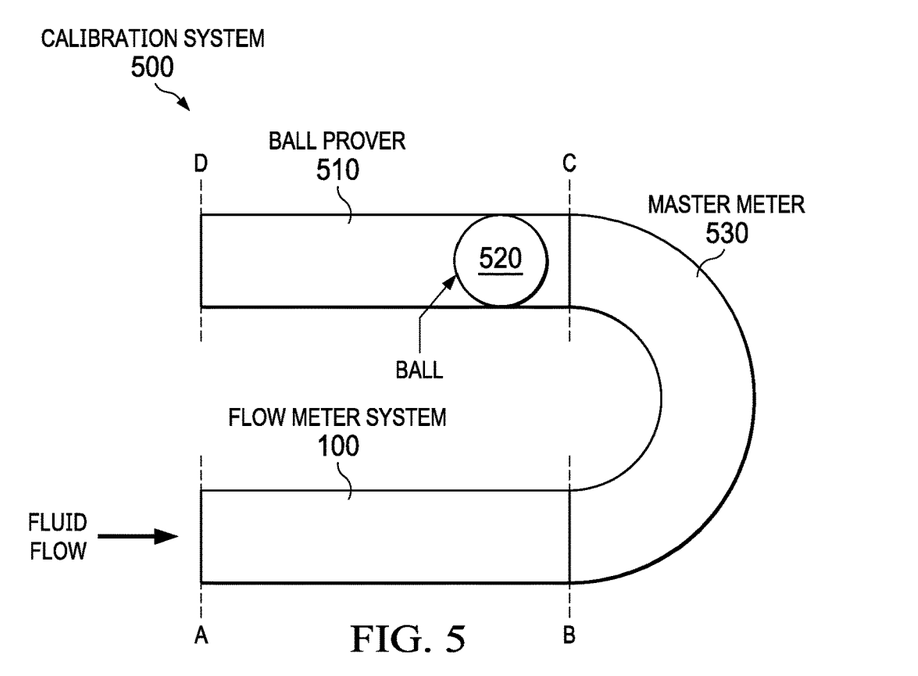
FIG. 5 is a schematic diagram of another calibration system.

FIG. 5 is a schematic diagram of another calibration system 500. The calibration system 500 is similar to the calibration system 400 in FIG. 4. Specifically, the calibration system 500 comprises the flow meter system 100 in FIG. 1 and a ball prover 510, and the ball prover 510 comprises a ball 520. However, instead of the connecting pipe 430 like in the calibration system 400, the calibration system 500 comprises a master meter 530. An operator or other entity pre-calibrates the master meter 530 against the ball prover 510.

Figure 6:
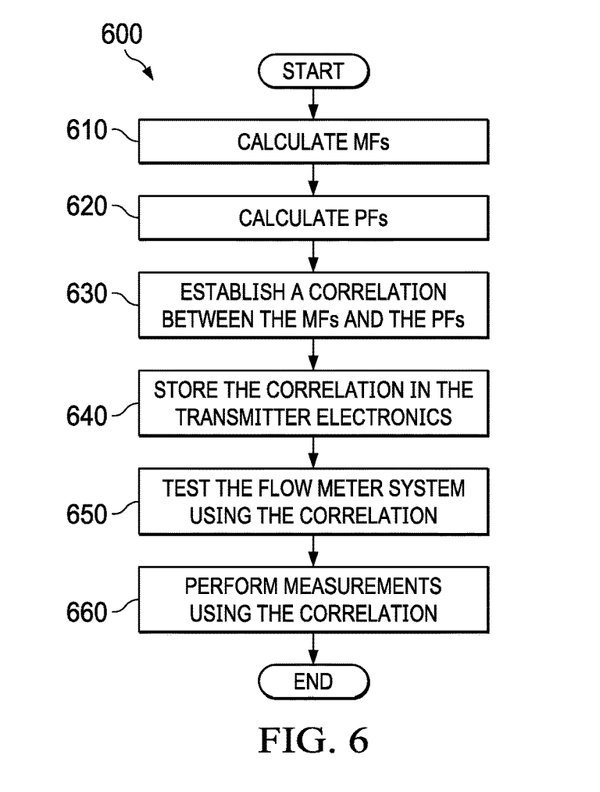
FIG. 6 is a flowchart illustrating a method of multi-fluid calibration according to an embodiment of the disclosure.

FIG. 6 is a flowchart illustrating a method 600 of multi-fluid calibration according to an embodiment of the disclosure. At step 610, MFs are calculated. An operator uses either the calibration system 400 or the calibration system 500 to calculate the MFs. Specifically, the operator calculates a volume $Q_{ref}$ of the ball prover 410 or 510 as follows:

$$Q_{ref} = CS_{ref} \times L_{C-D}. \quad (3)$$

$CS_{ref}$ is a known cross-sectional area of the ball prover 410 or 510, and $L_{C-D}$ is a length of the ball prover 410 or 510 from point C to point D. $Q_{ref}$ is in units of m³, $CS_{ref}$ is in units of m², and $L_{C-D}$ is in units of m. The operator obtains and determines a volume of a fluid. The operator causes the volume of the fluid to flow through the flow meter system 100 from point A to B. The flow meter system 100 calculates an average velocity of the fluid $v_{avg}$ given by:

$$v_{avg} = \Sigma_{i=A}^{D} v_i w_i. \quad (4)$$

$v_i$ is a chordal flow velocity for i=A-D, and $w_i$ is a chordal weighting factor for each chordal flow velocity $v_i$. $v_{avg}$ is in units of m/s, $v_i$ is in units of m/s, and $w_i$ is a dimensionless parameter. The operator then causes the volume of the fluid to pass the ball 420 or 520 from point C to point D in the ball prover 410 or 510, and the operator determines a time t it takes to do so. The operator calculates a volume $Q_{FMS}$ of the flow meter system 100 as follows:

$$Q_{FMS} = v_{avg} \cdot CS_{FMS} \cdot t. \quad (5)$$

$v_{avg}$ is the average velocity of the fluid, $CS_{FMS}$ is a known cross-sectional area of the flow meter system 100, and t is the time it takes the volume of the fluid to pass the ball 420 or 520 from point C to point D in the ball prover 410 or 510. $Q_{FMS}$ is in units of m³, $CS_{FMS}$ is in units of m², and t is in units of s. The operator then calculates an MF of the flow meter system 100 as follows:

$$MF = \frac{Q_{ref}}{Q_{FMS}}. \quad (6)$$

MF may be a constant around 1, for instance 0.98. As can be seen from equation (6), a ratio of a volume of the ball prover 410 or 510 to a volume of the flow meter system 100 yields MF.

At step 620, PFs are calculated. Using equation (2), the transmitter electronics 140 calculate a PF while the fluid passes from point A to point B in the flow meter system 100. PF in equation (2) may be a constant between about 1.1 and 1.30. Steps 610 and 620 are repeated in order to obtain a plurality of MFs and plurality of corresponding PFs for the fluid. Steps 610 and 620 may be repeated to obtain a plurality of MFs and a plurality of corresponding PFs for additional fluids as well.

At step 630, a correlation between the MFs and the PFs is established. For instance, the operator provides the MFs and the PFs to an algorithm. The operator may do so for multiple fluids. The algorithm generates an MF-PF curve based on the MFs and PFs. Such an algorithm is known in the art and may be a software program run on a separate computing device. The curve may be based on the following eighth-order polynomial equation:

$$MF = a_0 + a_1 PF + a_2 PF^2 + a_3 PF^3 + a_4 PF^4 + a_5 PF^5 + a_6 PF^6 + a_7 PF^7 + a_8 PF^8. \quad (7)$$

The algorithm determines $a_0$-$a_8$. Alternatively, the operator provides the MFs and the PFs to the algorithm separately for each fluid, and the algorithm generates MF-PF curves for each fluid.

Figure 7:
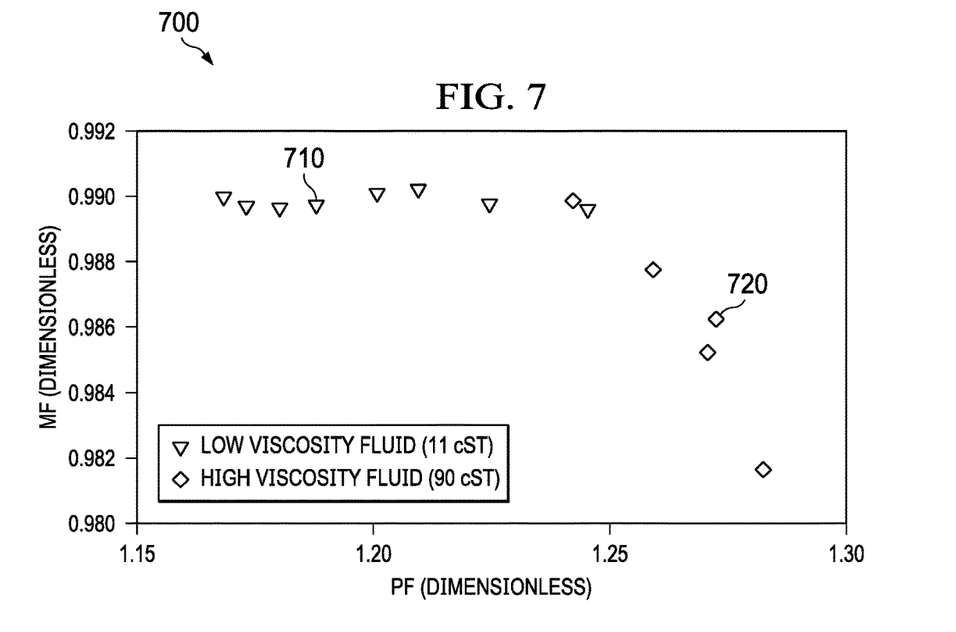
FIG. 7 is a graph of MF-PF curves according to an embodiment of the disclosure.

FIG. 7 is a graph 700 of MF-PF curves according to an embodiment of the disclosure. The x-axis represents a dimensionless PF, and the y-axis represents a dimensionless MF. A first curve 710, which is represented by downward-facing triangles and which corresponds to a low-viscosity fluid at about 11 cSt, provides a first correlation between PFs and MFs. A second curve 720, which is represented by diamonds and which corresponds to a high-viscosity fluid at about 90 cSt, provides a second correlation between PFs and MFs. The algorithm generates the first curve 710 and the second curve 720 using equation (7). The low-viscosity fluid has a PF range of about 1.17 to about 1.24, the high-viscosity fluid has a PF range of about 1.24 to about 1.28, and the low-viscosity fluid and the high-viscosity fluid overlap at a PF of about 1.24 in the graph 700, so the correlation represents both low-viscosity fluids and high-viscosity fluids across a broad range of PFs from about 1.17 to about 1.28. The algorithm may do so by separately generating the first curve 710 and the second curve 720, or the algorithm may do so by generating a single curve that incorporates both the first curve 710 and the second curve 720.

Figure 8:
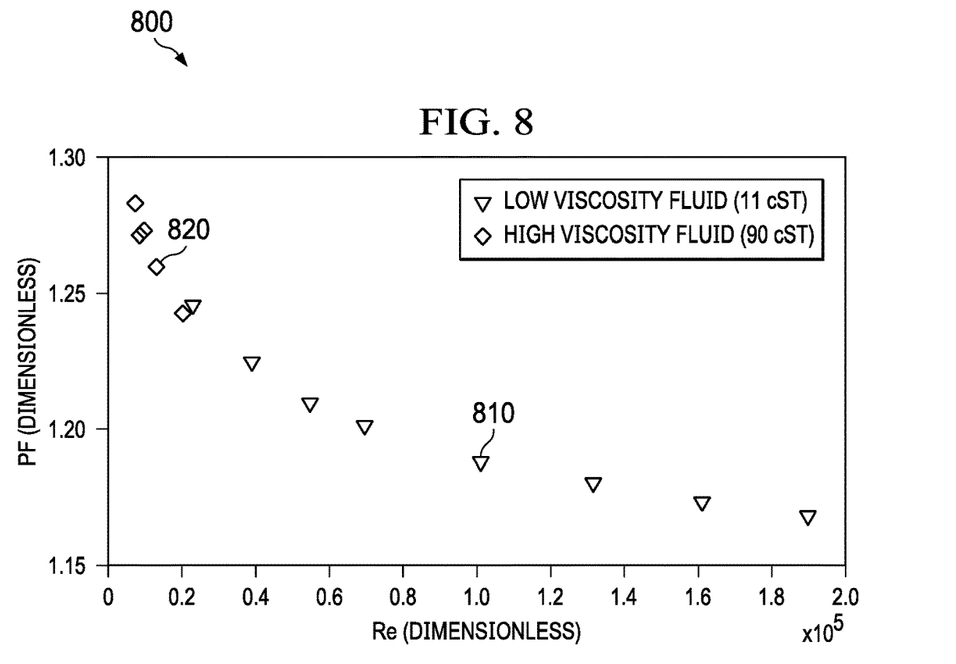
FIG. 8 is a graph demonstrating a correlation between PF and Reynolds number.

FIG. 8 is a graph 800 demonstrating a correlation between PF and Reynolds number. The x-axis represents a dimensionless Reynolds number, and the y-axis represents a dimensionless PF. A Reynolds number is a dimensionless parameter that describes whether a fluid is in laminar flow or turbulent flow. Typically, fluid flows with Reynolds numbers at or below 2,300 are laminar flows, fluid flows with Reynolds numbers between 2,300 and 5,000 are transitional fluid flows in which the state of the fluid flow may rapidly change between laminar flow and turbulent flow, and fluid flows with Reynolds numbers at or above 5,000 are typically turbulent flows. A first curve 810, which is represented by downward-facing triangles and which corresponds to a low-viscosity fluid at about 11 cSt, provides a first correlation between Reynolds number and PF. A second curve 820, which is represented by diamonds and which corresponds to a high-viscosity fluid at about 90 cSt, provides a second correlation between Reynolds number and PF. As shown, a single value for Reynolds number does not correlate to more than one value for PF. Thus, the correlation also represents both low-viscosity fluids and high-viscosity fluids across a broad range of Reynolds numbers. The graph 800 shows that the range of Reynolds number extends from about 7,000 to about 185,000, but the correlation may represent fluids with a range of Reynolds number from about 7,000 to about 200,000 or any range therein.

Returning to FIG. 6, at step 640, the correlation is stored in the transmitter electronics 140. For instance, the operator obtains the first curve 710 and the second curve 720 from the algorithm, combines the first curve 710 and the second curve 720 to form the correlation, and stores the correlation in the transmitter electronics 140. The transmitter electronics 140 may store the correlation as user input values in firmware. The correlation provides a correction to measurements such as volume measurements that the transmitter electronics 140 make. By storing and applying the correlation in the transmitter electronics 140, the flow meter system 100 may be referred to as a corrected or calibrated flow meter system or a MF-corrected or MF-calibrated flow meter system.

At step 650, the flow meter system 100 is tested using the correlation. Step 650 may be referred to as verification. The operator uses the calibration system 400 to verify the flow meter system 100 in a manner similar to step 610. Specifically, the operator causes a fluid to first pass through the flow meter system 100 and second pass through the ball prover 410, and the operator calculates the MF of the flow meter system 100 according to equation (6). However, unlike at step 610, the transmitter electronics 140 calculate a corrected volume $Q_{FMS}'$ of the flow meter system 100 as follows:

$$Q_{FMS}' = (v_{avg} \cdot MF) \cdot CS_{FMS} \cdot t \qquad (8)$$

As shown, the corrected volume $Q_{FMS}'$ corrects the volume $Q_{FMS}$ by multiplying the average velocity of the fluid $v_{avg}$ by MF. As mentioned above, $v_{avg}$ is an average velocity of the fluid, MF is an MF corresponding to a PF based on the correlation, $CS_{FMS}$ is the known cross-sectional area of the flow meter system 100, and t is the time it takes for the volume of the fluid to pass the ball 420 from point C to point D in the ball prover 410. $Q_{FMS}'$ is in units of m$^3$, $v_{avg}$ is in units of m/s, MF is dimensionless, $CS_{FMS}$ is in units of m$^2$, and t is in units of s. The operator then calculates MF', a corrected MF of the flow meter system 100 as follows:

$$MF' = \frac{Q_{ref}}{Q_{FMS'}}. \qquad (9)$$

MF' should approach 1 because $Q_{ref}$ and $Q_{FMS}'$ should be about the same. Thus, if MF' is not 1 or within an error margin of 1, then the operator repeats the method 600 until MF' is within the error margin. Once MF' is within the error margin, the method proceeds to step 660. The error margin is 0.15% or another error margin suitable for industry standards or other criteria.

Finally, at step 660, measurements are performed using the correlation. For instance, the transmitter electronics 140 first calculate the PF according to equation (2), second calculate a corresponding MF according to the correlation, and third calculate a volume Q of fluid passing through the flow meter system 100 as follows:

$$Q = (v_{avg} \cdot MF) \cdot CS_{FMS} \cdot t. \qquad (8)$$

As mentioned above, $v_{avg}$ is an average velocity of the fluid, MF is an MF corresponding to a PF based on the correlation, and $CS_{FMS}$ is the known cross-sectional area of the flow meter system 100. However, in this case, t is the time it takes for the volume of the fluid to pass from point A to point B in the flow meter system 100. Point A and point B can be as far away from each other as possible. Q is in units of m$^3$, $v_{avg}$ is in units of m/s, MF is dimensionless, $CS_{FMS}$ is in units of m$^2$, and t is in units of s. Though the PF, the corresponding MF, and the volume Q are described, other measurements such as individual chordal flow velocities, asymmetry in the velocity profile, and swirl angle may also be performed. By using MF in equation (8), the transmitter electronics 140 calibrate the flow meter system 100 by correcting a calculation or measurement of Q. The transmitter electronics 140 may do so for multiple fluids.

Figure 9:
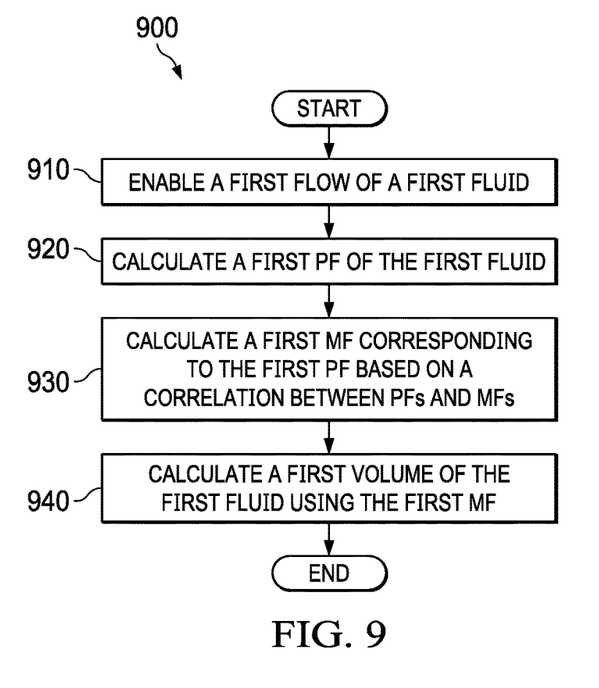
FIG. 9 is a flowchart illustrating a method of fluid flow measurement according to an embodiment of the disclosure.

FIG. 9 is a flowchart illustrating a method 900 of fluid flow measurement according to an embodiment of the disclosure. The flow meter system 100 implements the method 900. At step 910, a first flow of a first fluid is enabled. For instance, the flow meter system 100 enables a first fluid to flow through the flow meter 145. At step 920, a first PF of the first fluid is calculated. For instance, the transmitter electronics 140 calculate the first PF using equation (2). At step 930, a first MF corresponding to the first PF is calculated based on a correlation between PFs and MFs. For instance, the transmitter electronics 140 calculate the first MF based on the correlation described above with respect to step 630 in FIG. 6. Finally, at step 940, a first volume of the first fluid is calculated using the first MF. For instance, the transmitter electronics 140 calculate the first volume using MF as shown in equation (8).

Figure 10:
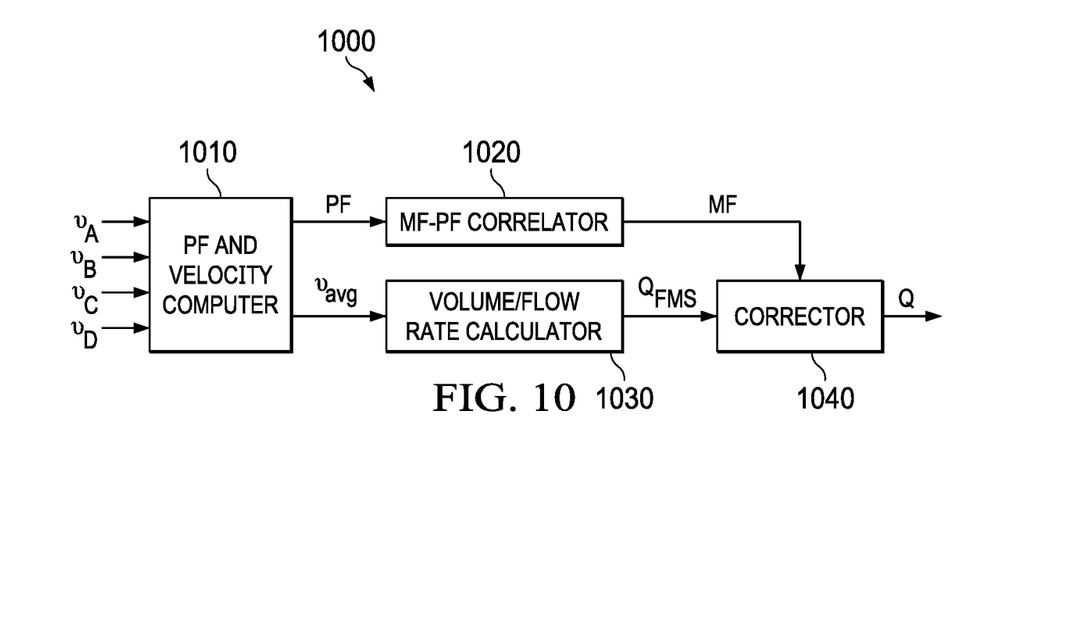
FIG. 10 is a model of multi-fluid calibration according to an embodiment of the disclosure.

FIG. 10 is a model 1000 of multi-fluid calibration according to an embodiment of the disclosure. The transmitter electronics 140 implement the model 1000. Using $v_{A-D}$ as inputs, a PF and velocity computer 1010 calculates PF using equation (2) and calculates $v_{avg}$ using equation (4). Using PF from the PF and velocity computer 1010, an MF-PF correlator 1020 provides MF using the correlation described in step 630 in FIG. 6 above. In addition, using $v_{avg}$ from the PF and velocity computer 1010, a volume/flow rate calculator 1030 calculates $Q_{FMS}$ using equation (5). Finally, using MF from the MF-PF correlator 1020 and using $Q_{FMS}$ from the volume/flow rate calculator 1030, a corrector 1040 calculates Q using equation (8).

Figure 11:
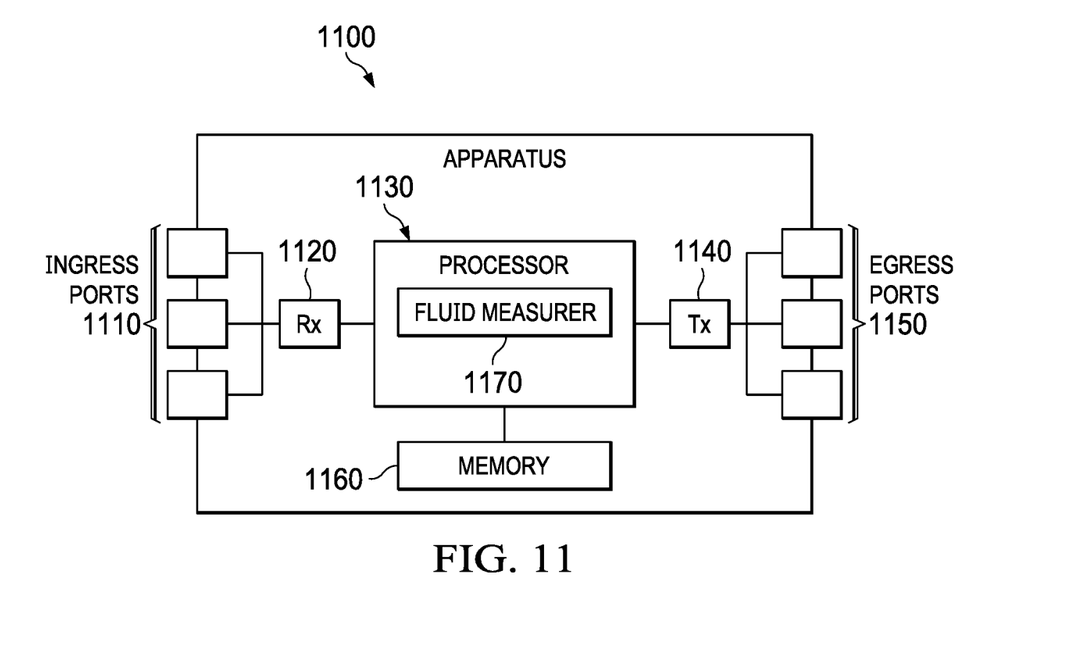
FIG. 11 is a schematic diagram of an apparatus according to an embodiment of the disclosure.

FIG. 11 is a schematic diagram of an apparatus 1100 according to an embodiment of the disclosure. The apparatus 1100 implements the disclosed embodiments. The apparatus 1100 may represent the transmitter electronics 140, implement a portion of the transmitter electronics 140, or implement a separate apparatus. The apparatus 1100 comprises ingress ports 1110 and an RX 1120 to receive data; a processor, logic unit, baseband unit, or CPU 1130 to process the data; a TX 1140 and egress ports 1150 to transmit the data; and a memory 1160 to store the data. The apparatus 1100 may also comprise OE components, EO components, or RF components coupled to the ingress ports 1110, the RX 1120, the TX 1140, and the egress ports 1150 for ingress or egress of electrical, optical, or RF signals.

The processor 1130 is any suitable combination of hardware, middleware, firmware, or software. The processor 1130 comprises any combination of one or more CPU chips, cores, FPGAs, ASICs, or DSPs. The processor 1130 communicates with the ingress ports 1110, RX 1120, TX 1140, egress ports 1150, and memory 1160. The processor 1130 comprises a fluid measurer 1170, which implements the disclosed embodiments. The inclusion of the fluid measurer 1170 therefore provides a substantial improvement to the functionality of the apparatus 1100 and effects a transformation of the apparatus 1100 to a different state. Alternatively, the memory 1160 stores the fluid measurer 1170 as instructions, and the processor 1130 executes those instructions. Alternatively, any suitable combination of components implements the disclosed embodiments.

The memory 1160 comprises one or more disks, tape drives, or solid-state drives. The apparatus 1100 may use the memory 1160 as an over-flow data storage device to store programs when the apparatus 1100 selects those programs for execution and to store instructions and data that the apparatus 1100 reads during execution of those programs. The memory 1160 may be volatile or non-volatile and may be any combination of ROM, RAM, TCAM, or SRAM.

The term "about" and its derivatives mean a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A flow meter system comprising:
   a flow meter configured to enable a first flow of a first fluid through the flow meter; and
   transmitter electronics coupled to the flow meter and configured to:
      calculate a first profile factor (PF) of the first fluid during the first flow,
      calculate a meter factor (MF) corresponding to the first PF based on a correlation, wherein the correlation is pre-stored before the first flow and associates a plurality of PFs with a plurality of MFs for multiple fluids of varying viscosities, and
      calculate a first volume of the first fluid using the first MF.

2. The flow meter system of claim 1, wherein the transmitter electronics are further configured to:
   calculate a second PF of the first fluid during the first flow,
   calculate a second MF corresponding to the second PF based on the correlation, and
   calculate a second volume of the first fluid using the second MF.

3. The flow meter system of claim 2, wherein the transmitter electronics are further configured to:
   further calculate the first volume when the first fluid flows through the flow meter at a first average velocity, and
   further calculate the second volume when the first fluid flows through the flow meter at a second average velocity.

4. The flow meter system of claim 1, wherein the flow meter is further configured to enable a second flow of a second fluid, and wherein the transmitter electronics are further configured to:
   calculate a second PF of the second fluid during the second flow,
   calculate a second MF corresponding to the second PF based on the correlation, and
   calculate a second volume of the second fluid using the second MF.

5. The flow meter system of claim 1, wherein the correlation is associated with the first fluid and a second fluid.

6. The flow meter system of claim 1, wherein the correlation represents fluids with PFs from about 1.17 to about 1.28.

7. The flow meter system of claim 1, wherein the correlation represents fluids with Reynolds numbers from about 5,000 to about 200,000.

8. The flow meter system of claim 1, wherein the flow meter comprises:
   an inner chord, and
   an outer chord.

9. The flow meter system of claim 8, wherein the first PF is directly proportional to an inner chordal flow velocity associated with the inner chord and indirectly proportional to an outer chordal flow velocity associated with the outer chord.

10. The flow meter system of claim 9, wherein the correlation is a polynomial equation.

11. The flow meter system of claim 10, wherein the transmitter electronics are further configured to further calculate the first volume using an average velocity of the first fluid, a cross-sectional area of the flow meter system, and a time it takes for the first fluid to pass through the flow meter system.

12. The flow meter system of claim 1, wherein the correlation is a two-dimensional curve.

13. A method comprising:
   enabling a first flow of a first fluid through a flow meter;
   calculating a first profile factor (PF) of the first fluid during the first flow;
   calculating a first meter factor (MF) corresponding to the first PF based on a correlation, wherein the correlation is pre-stored before the first flow and associates a plurality of PFs with a plurality of MFs for multiple fluids of varying viscosities; and
   calculating a first volume of the first fluid using the first MF.

14. The method of claim 13, further comprising:
   calculating a second PF of the first fluid during the first flow;
   calculating a second MF corresponding to the second PF based on the correlation; and calculating a second volume of the first fluid using the second MF.

15. The method of claim 13, further comprising:
enabling a second flow of a second fluid;
calculating a second PF of the second fluid during the second flow;
calculating a second MF corresponding to the second PF based on the correlation; and
calculating a second volume of the second fluid using the second MF.

16. The method of claim 13, wherein the correlation represents fluids with Reynolds numbers from about 5,000 to about 200,000.

17. The method of claim 13, wherein the first PF is directly proportional to an inner chordal flow velocity and indirectly proportional to an outer chordal flow velocity.

18. The method of claim 17, wherein the correlation is a polynomial equation.

19. The method of claim 18, further comprising further calculating the first volume using an average velocity of the first fluid, a cross-sectional area, and a time it takes for the first fluid to pass through.

20. The method of claim 13, wherein the correlation is a two-dimensional curve.

21. A method comprising:
establishing a correlation that associates a plurality of meter factors (MFs) with a plurality of profile factors (PFs) for both a first fluid and a second fluid, wherein the first fluid and the second fluid have different viscosities;
storing the correlation in transmitter electronics of a flow meter system;
testing the flow meter system using the correlation;
repeating the establishing, storing, and testing until a corrected MF is within an error margin of a predetermined constant; and
performing measurements using the correlation.

22. The method of claim 21, wherein the first fluid corresponds to a first Reynolds number range and the second fluid corresponds to a second Reynolds number range.

23. The method of claim 21, wherein the predetermined constant is 1.

24. The method of claim 23, wherein the error margin is 0.15%.

* * * * *